(12) United States Patent
Wang et al.

(10) Patent No.: US 12,304,861 B1
(45) Date of Patent: May 20, 2025

(54) LIGHTWEIGHT SOLID WASTE POROUS AGGREGATE, AND PREPARATION METHOD AND USE THEREOF

(71) Applicant: Inner Mongolia University of Technology, Hohhot (CN)

(72) Inventors: Xiaoxiao Wang, Hohhot (CN); Rongrong Feng, Hohhot (CN); Changwang Yan, Hohhot (CN); Shuguang Liu, Hohhot (CN); Ju Zhang, Hohhot (CN); Lei Jing, Hohhot (CN); Jie Li, Hohhot (CN); Liqiang Yin, Hohhot (CN)

(73) Assignee: Inner Mongolia University of Technology (CN)

( * ) Notice: Subject to any disclaimer, the term of this patent is extended or adjusted under 35 U.S.C. 154(b) by 0 days.

(21) Appl. No.: 18/777,753

(22) Filed: Jul. 19, 2024

(51) Int. Cl.
| | |
|---|---|
| *C04B 18/02* | (2006.01) |
| *C04B 18/08* | (2006.01) |
| *C04B 18/12* | (2006.01) |
| *C04B 18/24* | (2006.01) |
| *C04B 18/30* | (2006.01) |
| *C04B 20/04* | (2006.01) |

(52) U.S. Cl.
CPC ............ *C04B 18/023* (2013.01); *C04B 18/08* (2013.01); *C04B 18/12* (2013.01); *C04B 18/24* (2013.01); *C04B 18/30* (2013.01); *C04B 20/04* (2013.01)

(58) Field of Classification Search
CPC ....... C04B 18/023; C04B 18/08; C04B 18/12; C04B 18/24; C04B 18/30; C04B 20/04
See application file for complete search history.

(56) References Cited

FOREIGN PATENT DOCUMENTS

| CN | 101050097 A | 10/2007 |
|---|---|---|
| CN | 106746816 A | 5/2017 |
| CN | 112645688 A | 4/2021 |
| CN | 112979192 A | 6/2021 |
| CN | 114315407 A | 4/2022 |
| CN | 114751767 A | 7/2022 |
| CN | 116177990 A | 5/2023 |

OTHER PUBLICATIONS

CN First Office Action Re: CN 202410037915.3; dated Feb. 19, 2024; 18 pages.
Chen, Yan-wen, et al. "Preparation Process of Gangue Ceramisite Based on the Orthogonal Optimization Method," Mar. 31, 2025; Bulletin of the Chinese Ceramic Society; vol. 34, No. 3; 8 pages.
GB/T 17431.0-2010; "Lightweight aggregates and its test methods—Part 1: Lightweight aggregates," May 1, 2011.
GB/T 50081-2019; China Academy of Building Sciences Co., Ltd. Hangzhou Tongda Group Co., Ltd.; 113 pages.
JGJ/T 12-2019; "Technical standard for application of lightweight aggregate concrete." Jul. 30, 2019; 157 [ages/.

*Primary Examiner* — Anthony J Green
(74) *Attorney, Agent, or Firm* — Emerson Thomson & Bennett, LLC; Daniel A. Thomson

(57) ABSTRACT

Provided are a lightweight solid waste porous aggregate, and a preparation method and use thereof. The lightweight solid waste porous aggregate includes the following raw materials in parts by mass: 50 parts to 80 parts of a coal gangue, 20 parts to 50 parts of a fly ash, and 1 part to 3 parts of a straw.

11 Claims, 5 Drawing Sheets

LIGHTWEIGHT SOLID WASTE POROUS AGGREGATE, AND PREPARATION METHOD AND USE THEREOF

CROSS REFERENCE TO RELATED APPLICATION

This patent application claims the benefit and priority of Chinese Patent Application No. 202410037915.3 filed with the China National Intellectual Property Administration on Jan. 11, 2024, and entitled with "LIGHTWEIGHT SOLID WASTE POROUS AGGREGATE, AND PREPARATION METHOD AND USE THEREOF", the disclosure of which is incorporated by reference herein in its entirety as part of the present application.

TECHNICAL FIELD

The present disclosure relates to the technical field of solid waste porous aggregates, and in particular relates to a lightweight solid waste porous aggregate, and a preparation method and use thereof.

BACKGROUND

During the mining and use of coal, a large amount of solid waste, such as coal gangue and fly ash, can be produced and may not only occupy land but also cause serious environmental pollution during stockpiling. Coal solid waste is a bulk solid waste, and its efficient disposal and utilization is an inevitable requirement to promote the green and high-quality transformation and development of the coal industry.

China is one of the world's largest agricultural countries with abundant crop resources. However, high grain yields are accompanied by the production of large amounts of crop waste. According to statistics, the average output of crop straw resources over the past five years have been as high as 640 million tons. Only a small part of the crop straw resources has been comprehensively utilized, such as paper making, plate processing, and building insulation wall materials, while most of the crop straw resources are burned and landfilled on-site. As a result, a large amount of waste is generated during the treatment, which not only destroys the ecological environment, but also seriously affects human safety and comfort.

With the development of the construction industry in China, the consumption of construction materials such as sand and gravel aggregates has increased significantly. Most natural aggregates are derived from nature. Extensive mining of the aggregates causes soil erosion and deterioration of natural landscapes, seriously affecting the sustainable development of society. With the deepening of mining, natural aggregate resources are rapidly decreasing, and resource depletion is becoming increasingly prominent. Therefore, seeking alternatives to the sand and gravel is the focus of current research. Using solid waste to produce aggregates instead of natural aggregate resources can alleviate the overuse of natural resources and is also an effective way to achieve resource sustainability.

Chinese patent CN112979192A discloses a method for preparing a lightweight aggregate. A solid waste, fly ash, metakaolin, a foaming agent, and a heavy metal adsorbent are mixed and ground evenly, and then a core is obtained by granulation molding, steam curing, and oven drying; and a resin, the fly ash, a curing agent, and a diluent are mixed to obtain a composite slurry, which is sprayed onto a surface of a spherical particle to form a shell. The prepared lightweight aggregate shows extremely low water absorption and relatively high cylinder compressive strength. Chinese patent CN116177990A discloses a method and a system for producing a ceramsite lightweight aggregate from coal gangue and gypsum residue. Coal gangue, gypsum residue, a carbonaceous raw material, and a binder as ingredients are mixed, and the ceramsite lightweight aggregate is obtained by processes including granulation, sieving, aging, and roasting. In this patent, a variety of solid wastes can be collaboratively processed and the ceramsite lightweight aggregate can be prepared simultaneously and with relatively high quality. In the above-mentioned patents, solid waste is applied to lightweight aggregate, but additives such as a curing agent, a diluent, and a binder are used during the aggregate preparation, making the production cost high. Moreover, the preparation process is relatively cumbersome and cannot achieve large-scale production. Chinese patent CN112645688A discloses a method for producing a high-performance coal gangue ceramsite, including the following steps: raw material pretreatment, batching, granulation, drying, roasting, and cooling, where a roasting kiln includes: a preheating section, a decarbonizing section, and a roasting section. In this patent, the coal gangue resources are utilized to the maximum extent, and the product performance of the coal gangue ceramsite is improved. However, in this patent, a three-stage calcination process is required in the preparation of ceramsite, which is relatively complex and consumes high energy. Chinese patent CN114751767A discloses a porous aggregate for internal curing of ultrahigh-performance concrete. A bauxite tailing is used as a main raw material, silica fume is used as a component regulator, and nano-sized carbon powder and nano-sized iron oxide are used as a pore-forming agent, and a fine lightweight aggregate of 1 mm to 2 mm with high water absorption is prepared by molding, drying, and calcining. Chinese patent CN114315407A discloses a method for preparing a porous ceramic sand with a small particle size using a bauxite tailing. A bauxite tailing, silica fume, and a pore-forming agent are mixed evenly, and the porous ceramic sand is obtained by granulation, drying, and roasting. The prepared porous ceramic sand has a small particle size and high porosity, and can not only meet the performance requirements of ceramic sand for internal curing, but can also be used in lightweight aggregate concrete for structures. In this patent, solid waste is used as the main raw material to prepare porous aggregates, but the raw material of the solid waste is mostly industrial solid waste, so the types are relatively single. In addition, the pore-forming agent added to the raw materials makes the preparation of porous aggregates uneconomical and environmentally unfriendly.

SUMMARY

An object of the present disclosure is to provide a lightweight solid waste porous aggregate, and a preparation method and use thereof. Raw materials for preparation of the lightweight solid waste porous aggregate do not contain pore-forming agents and are economical and environmentally friendly.

To achieve the above object, the present disclosure provides the following technical solutions:

The present disclosure provides a lightweight solid waste porous aggregate, including the following raw materials in parts by mass: 50 parts to 80 parts of a coal gangue, 20 parts to 50 parts of a fly ash, and 1 part to 3 parts of a straw.

In some embodiments, the fly ash includes Grade I fly ash.

In some embodiments, the straw includes one or more selected from the group consisting of corn straw, rice straw, and wheat straw.

The present disclosure further provides a method for preparing the lightweight solid waste porous aggregate, including:
- immersing the straw in an alkali solution to obtain a pretreated straw;
- mixing a part of the fly ash and a part of the coal gangue, and then subjecting a resulting blend to first granulation to obtain a core material;
- mixing a remaining of the fly ash, a remaining of the coal gangue, and the pretreated straw to obtain a mixture, and then subjecting the mixture to second granulation such that the mixture wraps the core material to obtain a raw material globule; and
- subjecting the raw material globule to drying and calcination in sequence to obtain the lightweight solid waste porous aggregate.

In some embodiments, the alkali solution is a sodium hydroxide solution having a mass percentage concentration of 2% to 4%; and
the immersing is conducted at a temperature of 18° C. to 22° C. for 5 h to 7 h.

In some embodiments, a granulator used for the first granulation is operated at a speed of 40 r/min to 60 r/min; and a mass ratio of the part of the fly ash to the part of the coal gangue is in a range of (20-50):(80-50); and
a granulator used for the second granulation is operated at a speed of 80 r/min to 100 r/min; and a mass ratio of the remaining of the fly ash, the remaining of the coal gangue, and the pretreated straw is in a range of (20-50):(80-50):(1-4.5).

In some embodiments, the drying is conducted at a temperature of 100° C. to 105° C. for 4 h to 6 h.

In some embodiments, further including subjecting the raw material globule to preheating prior to the calcination, and the preheating is conducted at a temperature of 500° C. to 550° C. for 20 min to 30 min.

In some embodiments, the calcination is conducted at a temperature of 1,050° C. to 1,200° C. for 20 min to 30 min.

The present disclosure further provides use of the lightweight solid waste porous aggregate as described above or a lightweight solid waste porous aggregate prepared by the method as described above in a concrete.

The present disclosure provides a lightweight solid waste porous aggregate, including the following raw materials in parts by mass: 50 parts to 80 parts of coal gangue, 20 parts to 50 parts of a fly ash, and 1 part to 3 parts of a straw. In the present disclosure, the coal gangue, the fly ash, and the straw are used as raw materials in the preparation of aggregates, which can realize the comprehensive utilization of industrial solid waste and agricultural solid waste, and reduce the environmental pollution caused by solid waste accumulation and straw burning.

The present disclosure further provides a method for preparing the lightweight solid waste porous aggregate, including: immersing the straw in an alkali solution to obtain a pretreated straw; mixing a part of the fly ash and a part of the coal gangue, and then subjecting a resulting blend to first granulation to obtain a core material; mixing a remaining of the fly ash, a remaining of the coal gangue, and the pretreated straw to obtain a mixture, and then subjecting the mixture to second granulation such that the mixture wraps the core material to obtain a raw material globule; and subjecting the raw material globule to drying and calcination in sequence to obtain the lightweight solid waste porous aggregate. During the preparation, the straw forms pores during the calcination, resulting in the formation of large diameter pores inside the aggregate. At the same time, liquid phase particles are formed by melting during the calcination (specifically, calcium oxide, aluminum oxide, and silicon oxide in the raw material coal gangue and fly ash undergo chemical reaction at high temperature to form anorthite, mullite and other crystal particles), and accumulation of the liquid phase particles also causes the formation of pores in the aggregate (including three types of pores: the first type being the pores formed by burning straw; the second type being the pores formed by the accumulation of liquid particles; and the third type being the pores produced by the chemical reaction of the foaming material at high temperature to produce gas, and the liquid phase surrounding the gas; where the third type of foaming material is mainly elemental C and ferric oxide in the coal gangue and fly ash; the elemental C in the coal gangue and fly ash can react with oxygen in the air to generate carbon dioxide, or the ferric oxide in the coal gangue and fly ash can react with elemental C to generate ferric oxide and carbon dioxide). The three types of pores inside the aggregate constitute the pore structure loaded inside the porous aggregate. The complex pore structure can make the solid waste porous aggregate have desirable thermal insulation properties, and can be applied to concrete to improve the thermal insulation properties of concrete.

BRIEF DESCRIPTION OF THE DRAWINGS

FIG. 1A to FIG. 1D show microtopography graphs of the lightweight solid waste porous aggregates prepared in Examples 3 to 5 and Comparative Example 1, wherein FIG. 1A represents Comparative Example 1, FIG. 1B represents Example 3, FIG. 1C represents Example 4, and FIG. 1D represents Example 5.

FIG. 2A to FIG. 2B show pore size distribution graphs of the lightweight solid waste porous aggregate prepared in Examples 3 to 5 and Comparative Example 1, wherein FIG. 2A represents the pore diameter evolution diagram, and FIG. 2B represents the pore volume evolution diagram.

DETAILED DESCRIPTION OF THE EMBODIMENTS

Figure 1A:
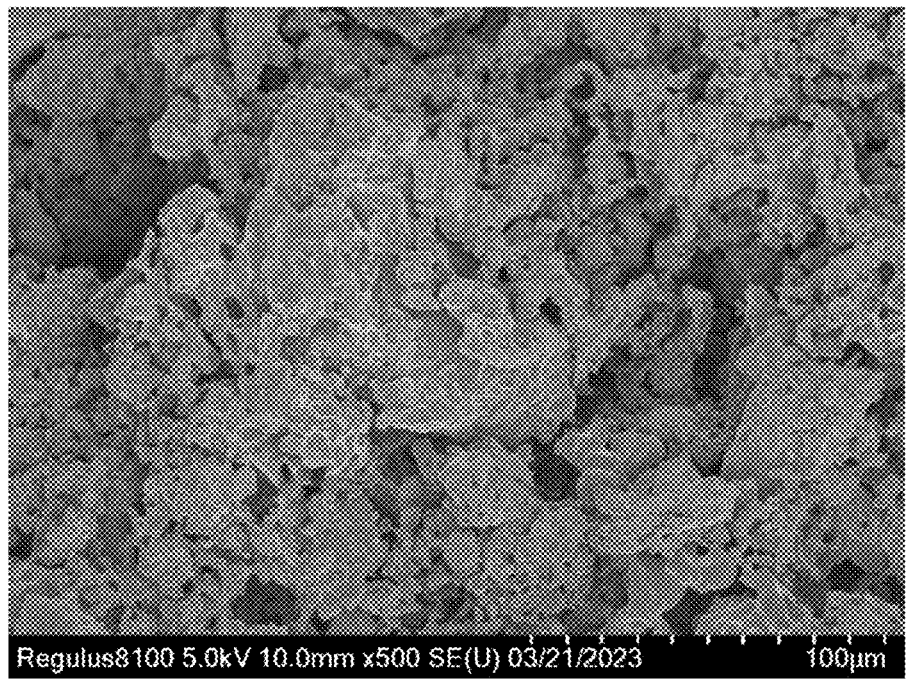

The present disclosure provides a lightweight solid waste porous aggregate, including the following raw materials in parts by mass: 50 parts to 80 parts of coal gangue, 20 parts to 50 parts of a fly ash, and 1 part to 3 parts of a straw.

In the present disclosure, unless otherwise specified, all raw materials for preparation are commercially available products well known to those skilled in the art.

In the present disclosure, the raw materials for preparation the lightweight solid waste porous aggregate includes 50 parts to 80 parts, preferably 55 parts to 75 parts, and more preferably 60 parts to 70 parts of a coal gangue in parts by mass. There are no special restrictions on the source and composition of the coal gangue, and sources and compositions well known to those skilled in the art may be used. In some embodiments, the coal gangue is specifically coal gangue from Ordos City, Inner Mongolia, and the coal gangue from Ordos City, Inner Mongolia has a chemical composition as shown in Table 1:

Table 1 Chemical composition (wt %) of the coal gangue from Ordos City, Inner Mongolia

| Component | $Al_2O_3$ | $SiO_2$ | CaO | $SO_3$ | $TiO_2$ | $Fe_2O_3$ | $K_2O$ | MgO | $P_2O_5$ |
|---|---|---|---|---|---|---|---|---|---|
| Content | 48.291 | 42.684 | 2.279 | 1.7 | 1.309 | 1.258 | 0.548 | 0.516 | 0.057 |

In the present disclosure, the main components of the coal gangue are silica and alumina, which are melted at high temperature to form a liquid phase, and the liquid phase forms a skeleton of the aggregate and provides strength to the aggregate.

In the present disclosure, the raw materials for preparation the lightweight solid waste porous aggregate includes 20 parts to 50 parts, preferably 25 parts to 45 parts, and more preferably 30 parts to 40 parts of a fly ash in parts by mass. In some embodiments of the present disclosure, the fly ash includes Grade I fly ash. There are no special restrictions on the source and composition of the Grade I fly ash, and sources and compositions well known to those skilled in the art may be used. In some embodiments, the Grade I fly ash is specifically Grade I fly ash produced by Jinqiao Thermal Power Plant in Hohhot, Inner Mongolia, and the Grade I fly ash produced by Jinqiao Thermal Power Plant in Hohhot, Inner Mongolia has a chemical composition as shown in Table 2:

Table 2 Chemical composition (wt %) of the Grade I fly ash produced by Jinqiao Thermal Power Plant in Hohhot, Inner Mongolia

| Component | $SiO_2$ | $Al_2O_3$ | CaO | $Fe_2O_3$ | MgO | $Na_2O$ | $K_2O$ | $SO_3$ | $TiO_2$ |
|---|---|---|---|---|---|---|---|---|---|
| Content | 48.08 | 22.69 | 15.17 | 4.45 | 2.768 | 2.009 | 1.525 | 1.425 | 0.612 |

In the present disclosure, the main components of the fly ash are silica, alumina, and calcium oxide. The calcium oxide acts as a fluxing agent as an alkaline oxide and can reduce the calcination temperature of the aggregate, while the silica and alumina react at high temperatures to form anorthite and other crystals, which form an aggregate skeleton and provide strength to the aggregate.

In the present disclosure, the raw materials for preparation the lightweight solid waste porous aggregate includes 1 part to 3 parts, preferably 1.5 parts to 2.5 parts, and more preferably 1.8 parts to 2.2 parts of a straw in parts by mass. In some embodiments of the present disclosure, the straw includes one or more selected from the group consisting of corn straw, rice straw, and wheat straw; under the condition that the straw includes two or more of the above-mentioned specific substances, there is no special limitation on the proportion of the above-mentioned specific substances, which can be mixed in any proportion.

In the present disclosure, the straw is intended to form pores in the aggregate after burning, thereby forming a porous structure of the aggregate.

The present disclosure further provides a method for preparing the lightweight solid waste porous aggregate, including:
   immersing the straw in an alkali solution to obtain a pretreated straw;
   mixing a part of the fly ash and a part of the coal gangue, and then subjecting a resulting blend to first granulation to obtain a core material;
   mixing a remaining of the fly ash, a remaining of the coal gangue, and the pretreated straw to obtain a mixture, and then subjecting the mixture to second granulation such that the mixture wraps the core material to obtain a raw material globule; and
   subjecting the raw material globule to drying and calcination in sequence to obtain the lightweight solid waste porous aggregate.

In the present disclosure, the straw is immersed in an alkali solution to obtain the pretreated straw.

In some embodiments of the present disclosure, the straw is crushed and sieved in sequence prior to the immersing. There is no special limitation on the crushing process, and the process well known to those skilled in the art may be used. In some embodiments, the sieving is conducted with a 5-mesh square hole sieve. In some embodiments of the present disclosure, a straw fiber obtained after the sieving has a length of 4.5 mm to 5.5 mm, and preferably 5 mm.

In some embodiments of the present disclosure, the alkali solution is a sodium hydroxide solution having a mass percentage concentration of 2% to 4%, and preferably 2% to 3%; the immersing is conducted at a temperature of 18° C. to 22° C., preferably 19° C. to 21° C., and more preferably 20° C.; and the immersing is conducted for 5 h to 7 h, preferably 5 h to 6 h, and more preferably 6 h.

In some embodiments of the present disclosure, after the immersing is finished, the method further includes washing a resulting immersed straw with clean water. There is no special limitation on the washing process, and the process well known to those skilled in the art may be used, so that a resulting washed straw has a pH value of 7. In some embodiments of the present disclosure, after the washing is finished, the method further includes drying the washed straw; the drying is conducted by oven drying; the oven drying is conducted at a temperature of 100° C. to 105° C., preferably 102° C. to 105° C., and more preferably 105° C.; and the oven drying is conducted for 4 h to 6 h, preferably 4 h to 5 h, and more preferably 5 h.

In the present disclosure, by immersing the straw in the alkali solution, saccharides and lignin in the straw can be dissolved, and a wax layer on the surface of the straw can be removed. In this way, the bonding between the straw, the coal gangue powder, and the fly ash powder is improved, so that the raw material globule has better wrapping properties, thereby improving the strength of the aggregate.

In the present disclosure, a part of the fly ash and a part of the coal gangue are mixed and then a resulting blend is subjected to first granulation to obtain a core material.

In some embodiments of the present disclosure, the part of the coal gangue is a part of a coal gangue powder; the part of the coal gangue powder is prepared by a process including crushing, ball milling, and sieving the coal gangue in sequence; the crushing is conducted in a jaw crusher; and the ball milling is conducted in a ball mill. There are no special limitations on the crushing and ball milling processes, and the processes well known to those skilled in the art may be used. In some embodiments of the present disclosure, the sieving is conducted with a 0.15 mm sieve to remove larger particles and impurities in the coal gangue.

In some embodiments of the present disclosure, a mass ratio of the part of the fly ash to the part of the coal gangue is in a range of (20-50):(80-50), preferably (20-30):(80-70), and more preferably 30:70. In some embodiments of the present disclosure, a mass ratio of the part of the fly ash to the remaining fly ash is in a range of (20-50):(80-50), preferably (20-30):(80-70), and more preferably 30:70.

In some embodiments of the present disclosure, the mixing of the part of the fly ash and the part of the coal gangue is conducted under stirring. There is no special limitation on the stirring process, and the process well known to those skilled in the art may be used.

In some embodiments of the present disclosure, a granulator used for the first granulation is operated at a speed of 40 r/min to 60 r/min, preferably 50 r/min to 60 r/min, and more preferably 60 r/min.

In some embodiments of the present disclosure, the first granulation is conducted by spraying water. There is no special limitation on the process of spraying water, and the process well known to those skilled in the art may be used.

In some embodiments of the present disclosure, after the first granulation is finished, the method further includes passing resulting granulated pellets through a 4 mm square hole sieve to remove a residual material that has not been formed into pellets to obtain an upper core material (core pellet) of about 5 mm.

In the present disclosure, after obtaining the core material, a remaining fly ash, a remaining coal gangue, and the pretreated straw are mixed to obtain a mixture, and the mixture is subjected to second granulation such that the mixture wraps the core material to obtain a raw material globule.

In some embodiments of the present disclosure, the remaining coal gangue is a remaining coal gangue powder; the remaining coal gangue powder is prepared by a process including crushing, ball milling, and sieving the coal gangue in sequence; the crushing is conducted in a jaw crusher; and the ball milling is conducted in a ball mill. There are no special limitations on the crushing and ball milling processes, and the processes well known to those skilled in the art may be used. In some embodiments of the present disclosure, the sieving is conducted with a 0.15 mm sieve to remove larger particles and impurities in the coal gangue.

In some embodiments of the present disclosure, a mass ratio of the remaining of the fly ash, the remaining of the coal gangue, and the pretreated straw is in a range of (20-50):(80-50):(1-4.5), preferably (20-30):(80-70):(2-3), and more preferably 30:70:2.

In some embodiments of the present disclosure, the mixing of the remaining of the fly ash, the remaining of the coal gangue, and the pretreated straw is conducted under stirring. There is no special limitation on the stirring process, and the process well known to those skilled in the art may be used.

In some embodiments of the present disclosure, the second granulation is conducted by a process including putting the core material into a granulator, spraying water onto the core material in the granulator, adding the mixture obtained by mixing to wrap the core material, and adding water to allow granulation. In some embodiments of the present disclosure, the water is added in an amount of 20% to 25% of a total mass of the coal gangue, the fly ash, and the straw.

In some embodiments of the present disclosure, a granulator used for the second granulation is operated at a speed of 80 r/min to 100 r/min, preferably 90 r/min to 100 r/min, and more preferably 100 r/min.

In some embodiments of the present disclosure, after the second granulation is finished, the method further comprises screening and selecting a raw material globule having a particle size of about 10 mm.

In the present disclosure, the raw material globule is subjected to drying and calcination in sequence to obtain the lightweight solid waste porous aggregate.

In some embodiments of the present disclosure, the drying is conducted by oven drying; and the oven drying is conducted in a forced air drying oven. In some embodiments of the present disclosure, the drying is conducted at a temperature of 100° C. to 105° C., and the drying is conducted for 5 h to 6 h. In the present disclosure, the drying is intended to remove moisture while avoiding cracking on the surface of the aggregate due to a sharp increase in temperature during subsequent calcination.

In some embodiments of the present disclosure, the method further includes preheating prior to the calcination; the preheating is conducted at a temperature of 500° C. to 550° C., preferably 500° C. to 520° C., and more preferably 500° C.; the preheating is conducted for 20 min to 30 min, preferably 25 min to 30 min, and more preferably 30 min; and heating to a temperature of the preheating is conducted at a heating rate of 5° C./min to 10° C./min, preferably 5° C./min to 8° C./min, and more preferably 5° C./min.

In some embodiments of the present disclosure, the calcination is conducted at a temperature of 1,050° C. to 1,200° C., preferably 1,080° C. to 1,160° C., and more preferably 1,100° C. to 1,130° C.; the calcination is conducted for 20 min to 30 min, preferably 25 min to 30 min, and more preferably 30 min; heating to a temperature of the calcination is conducted at a heating rate of 5° C./min to 10° C./min, preferably 8° C./min to 10° C./min, and more preferably 10° C./min; and a starting temperature of the heating is the preheating temperature.

In some embodiments of the present disclosure, after the calcination is finished, the method further includes cooling; and the cooling is conducted by a process including taking the aggregate out from a high-temperature furnace and placing in a tray when a temperature in the furnace drops below 500° C., and then naturally cooling to room temperature at room temperature.

In the present disclosure, the internal pores of the lightweight solid waste porous aggregate prepared by the preparation method are composed of three parts. The first part is the gas generated by a foaming component in the raw material, including the oxidation of carbon with specific reaction equations: $C+O_2 \rightarrow CO_2$, $C+O_2 \rightarrow CO$; the decomposition of carbonate with specific reaction equations: $CaCO_3 \rightarrow CaO+CO_2$, $MgCO_3 \rightarrow MgO+CO_2$; the decomposition and oxidation of sulfide with specific reaction equations: $FeS_2 \rightarrow FeS+S$, $S+O_2 \rightarrow SO_2$; the decomposition and reduction of ferric oxide with specific reaction equations: $2Fe_2O_3+C \rightarrow 4FeO+CO_2$, $2Fe_2O_3+3C \rightarrow 4Fe+3CO_2$, $Fe_2O_3+C \rightarrow 2FeO+CO$, $Fe_2O_3+3C \rightarrow 2Fe+3CO$. The second part is the pores formed after burning the straw. The third part is that the aggregate melts to form liquid phase particles during high-temperature calcination, and the liquid phase particles accumulate to form pores. The above three parts of pores constitute a complex pore structure inside the porous coarse aggregate, giving it desirable thermal insulation capabilities.

The present disclosure further provides use of the lightweight solid waste porous aggregate as described above or a lightweight solid waste porous aggregate prepared by the preparation method as described above in a concrete. In the present disclosure, there is no special limitation on the method for use, and the methods well known to those skilled in the art may be used.

The lightweight solid waste porous aggregate, and the preparation method and the use thereof provided by the present disclosure will be described in detail with reference with the following examples, but they should not be construed as limiting the protection scope of the present disclosure.

Examples 1 to 9 and Comparative Example 1

Figure 3:
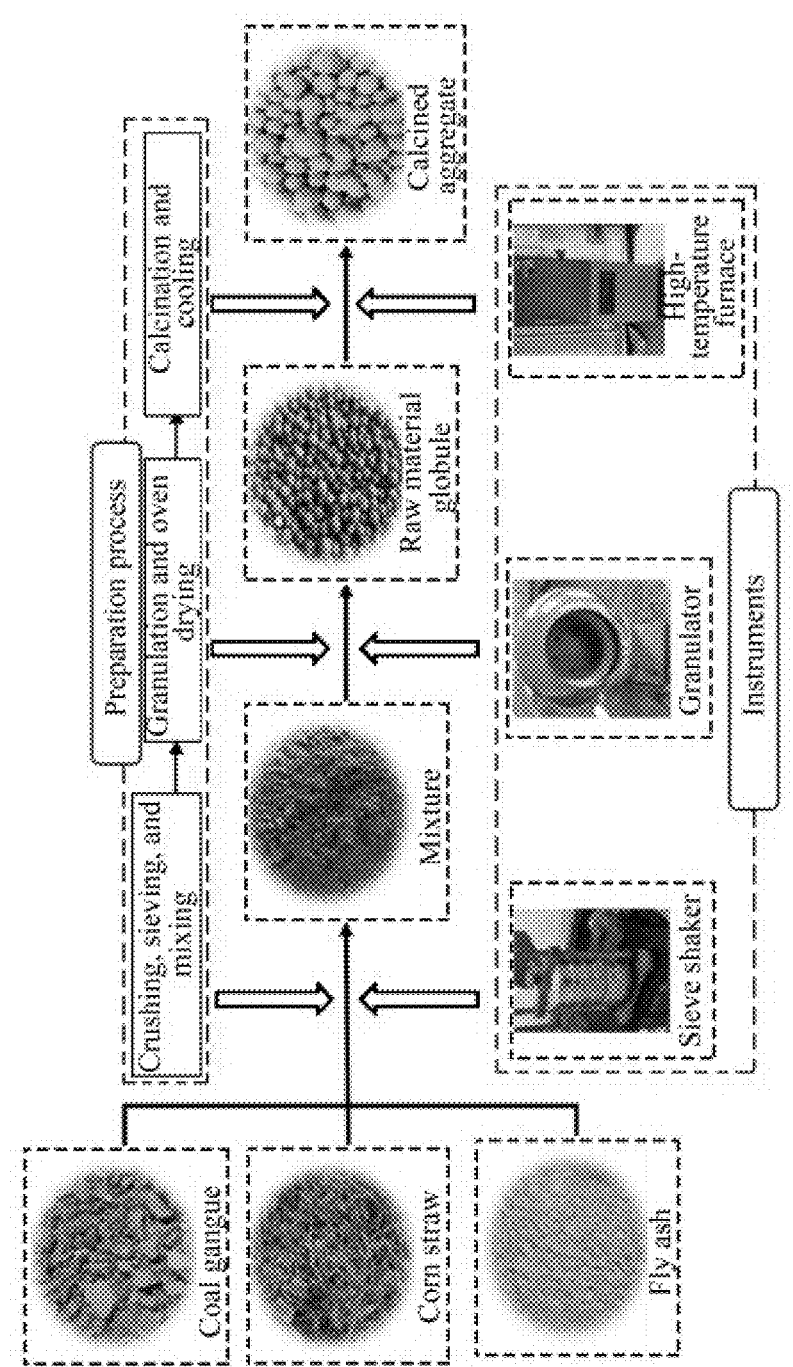
FIG. 3 shows a schematic diagram of the preparation process of the lightweight solid waste porous aggregate according to an embodiment of the present disclosure.

As shown in FIG. 3, a lightweight solid waste porous aggregate was prepared by a process as below:

A coal gangue (coal gangue from Ordos City, Inner Mongolia, with a chemical composition as shown in Table 1) was put into a jaw crusher and crushed, and then transferred to a ball mill and ground into a powder. The powder was sieved with a 0.15 mm sieve to remove larger particles and impurities in the coal gangue to obtain a coal gangue powder.

A straw (specifically corn straw) was put and crushed in a crusher, and then passed through a 5-mesh square hole sieve to obtain a straw fiber with a length of about 5 mm.

A part of the coal gangue powder (with a dosage as shown in Table 1) and a part of the fly ash (with a dosage as shown in Table 1) were added to a mixer and mixed evenly, then transferred to a granulator. A speed rate of the granulator was adjusted to 60 r/min. The resulting mixture was sprayed with water, so that the mixture was rolled into pellets with a particle size of about 5 mm in the granulator. The pellets were taken out from the granulator and passed through a 4-mm square hole sieve to remove a residual material that had not been formed into pellets, thereby obtaining pellets having a particle size of about 5 mm on the upper part of the sieve, as a core material.

The remaining of the coal gangue powder (with a dosage as shown in Table 1), the remaining of the fly ash (with a dosage as shown in Table 1), and 1 g of the straw fiber were put in a mixer and stirred evenly to obtain a mixture. The core material was put in a granulator. A speed rate of the granulator was adjusted to 100 r/min. The core material in the granulator was sprayed with water, and then the mixture was added thereto to wrap the core material. 20% water of a total mass of the coal gangue, the fly ash, and the straw was added thereto to allow granulation, and a raw material globule was selected with a particle size of about 10 mm.

The raw material globule was put in a blast drying oven and dried at 105° C. for 5 h to remove moisture contained therein, and then calcined in a high-temperature box furnace. Before the calcination, the high-temperature furnace was heated to a preheating temperature at 10° C./min to allow preheating for 30 min, and then heated to a calcination temperature at 5° C./min to allow calcination for 30 min. When the temperature in the furnace dropped below 500° C., the obtained aggregate was removed from the high-temperature furnace and placed in a tray, and then naturally cooled to room temperature indoors to obtain a lightweight solid waste porous aggregate.

Table 3 Raw material ratios and calcination condition parameters of the lightweight solid waste porous aggregates prepared in Examples 1 to 9 and Comparative Example 1

| Example | Part of coal gangue/g | Remaining of coal gangue/g | Part of fly ash/g | Remaining of fly ash/g | Straw/g | Preheating temperature/° C. | Preheating time/min | Calcination temperature/° C. | Calcination time/min |
|---|---|---|---|---|---|---|---|---|---|
| Example 1 | 35 | 35 | 15 | 26 | 1 | 500 | 30 | 1150 | 30 |
| Example 2 | 30 | 30 | 20 | 20 | 1 | 500 | 30 | 1150 | 30 |
| Example 3 | 25 | 25 | 25 | 25 | 1 | 500 | 30 | 1150 | 30 |
| Example 4 | 35 | 25 | 15 | 15 | 2 | 500 | 30 | 1150 | 30 |
| Example 5 | 35 | 35 | 15 | 15 | 3 | 500 | 30 | 1150 | 30 |
| Example 6 | 35 | 35 | 15 | 15 | 1 | 500 | 30 | 1100 | 30 |
| Example 7 | 35 | 35 | 15 | 15 | 1 | 500 | 30 | 1200 | 30 |
| Example 8 | 40 | 40 | 10 | 10 | 1 | 500 | 30 | 1150 | 30 |
| Comparative Example 1 | 35 | 35 | 15 | 15 | 0 | 500 | 30 | 1150 | 30 |
| Example 9 | 35 | 35 | 15 | 15 | 1 | 500 | 30 | 1050 | 30 |

Test Example

The porosity and pore size distribution of the lightweight solid waste porous aggregates prepared in Examples 1 to 9 and Comparative Example 1 were tested with a mercury porosimeter; the cylinder compressive strength of the lightweight solid waste porous aggregates prepared in Examples 1 to 9 and Comparative Example 1 was measured with a universal press; the thermal conductivity of the lightweight solid waste porous aggregates prepared in Examples 1 to 9 and Comparative Example 1 was tested using a thermal conductivity meter; the microscopic appearances of the lightweight solid waste porous aggregates prepared in Examples 1 to 9 and Comparative Example 1 were observed using a scanning electron microscope (SEM); according to "Lightweight aggregates and test methods thereof—Part I: Lightweight aggregates" (GB/T17431.1-2010), the bulk density of the lightweight solid waste porous aggregates prepared in Examples 1 to 9 and Comparative Example 1 was tested (where aggregates with a bulk density of less than 1,200 kg/m³ were lightweight aggregates, that is, lightweight aggregates). The test results of the porosity, cylinder pressure strength, thermal conductivity, and bulk density are shown in Table 4:

Table 4 Porosity, cylinder compressive strength, and thermal conductivity of the lightweight solid waste porous aggregates prepared in Examples 1 to 9 and Comparative Example 1

| Group | Porosity/% | Bulk density (kg/m³) | Cylinder compressive strength/MPa | Thermal conductivity/ (W/m · K) |
|---|---|---|---|---|
| Example 1 | 49.02 | 732.11 | 2.3841 | 0.111 |
| Example 2 | 48.63 | 774.8 | 3.5037 | 0.139 |
| Example 3 | 45.94 | 874.07 | 5.8969 | 0.146 |
| Example 4 | 49.73 | 722.33 | 2.2081 | 0.095 |
| Example 5 | 52.78 | 708.3 | 1.8311 | 0.086 |
| Example 6 | 50.68 | 730.63 | 1.4168 | 0.099 |
| Example 7 | 45.83 | 755.5 | 2.8518 | 0.123 |
| Example 8 | 54.67 | 701.17 | 1.7683 | 0.099 |
| Comparative Example 1 | 36.79 | 778.47 | 2.5261 | 0.121 |
| Example 9 | 53.4 | 734.2 | 1.2274 | 0.093 |

Figure 1B:
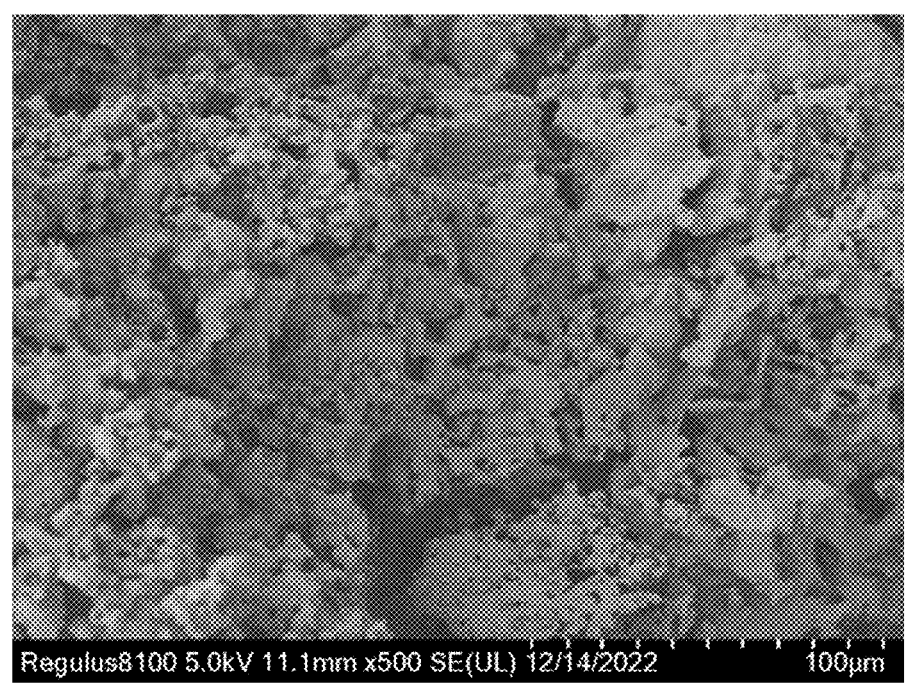
Figure 1C:
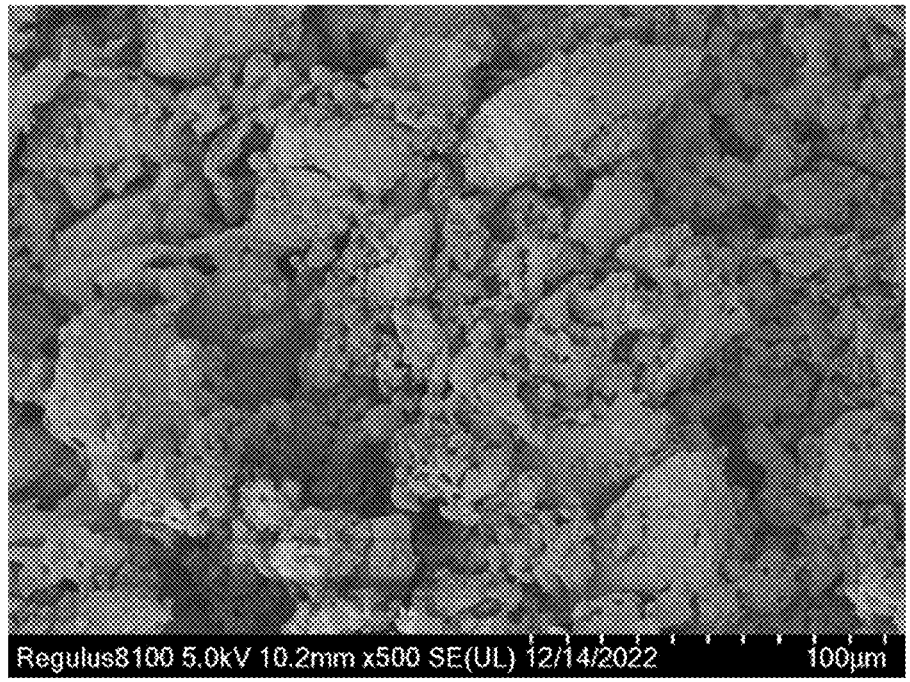
Figure 1D:
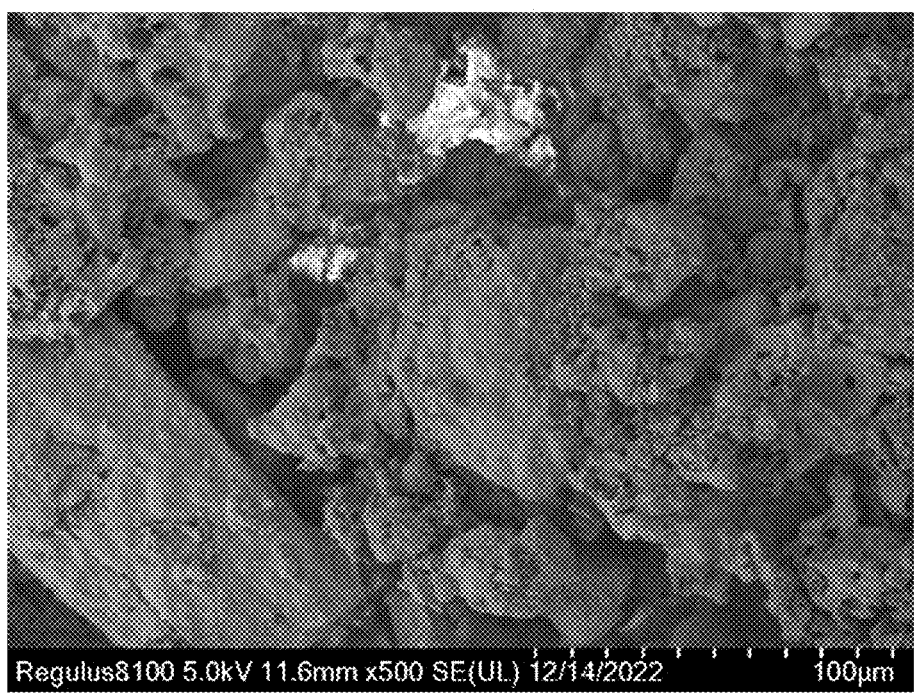
Figure 2A:
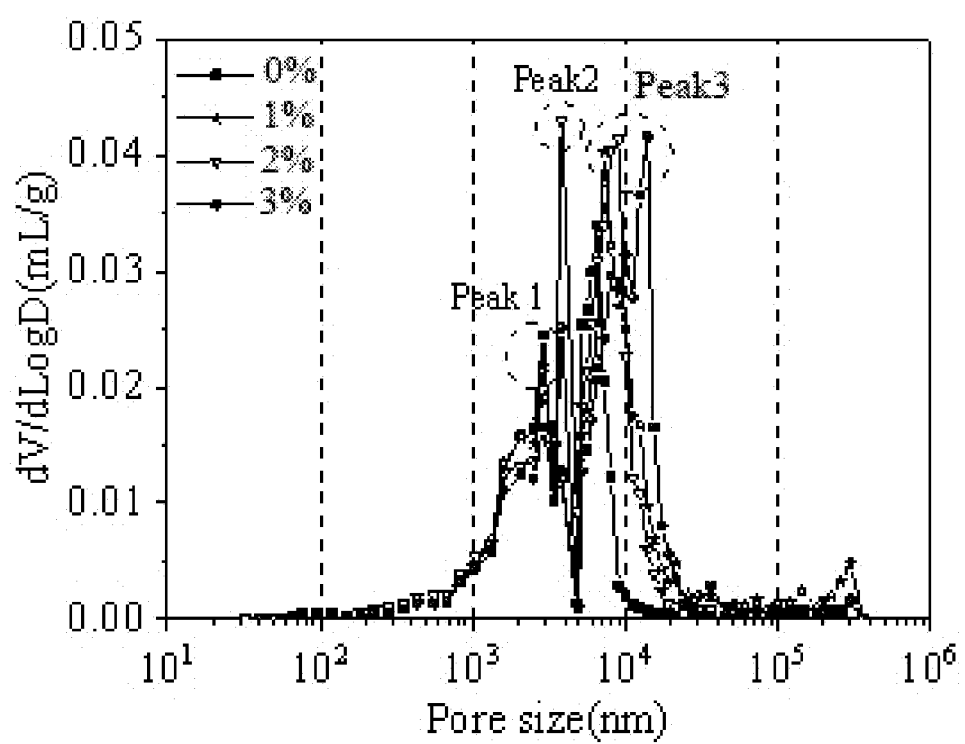
Figure 2B:
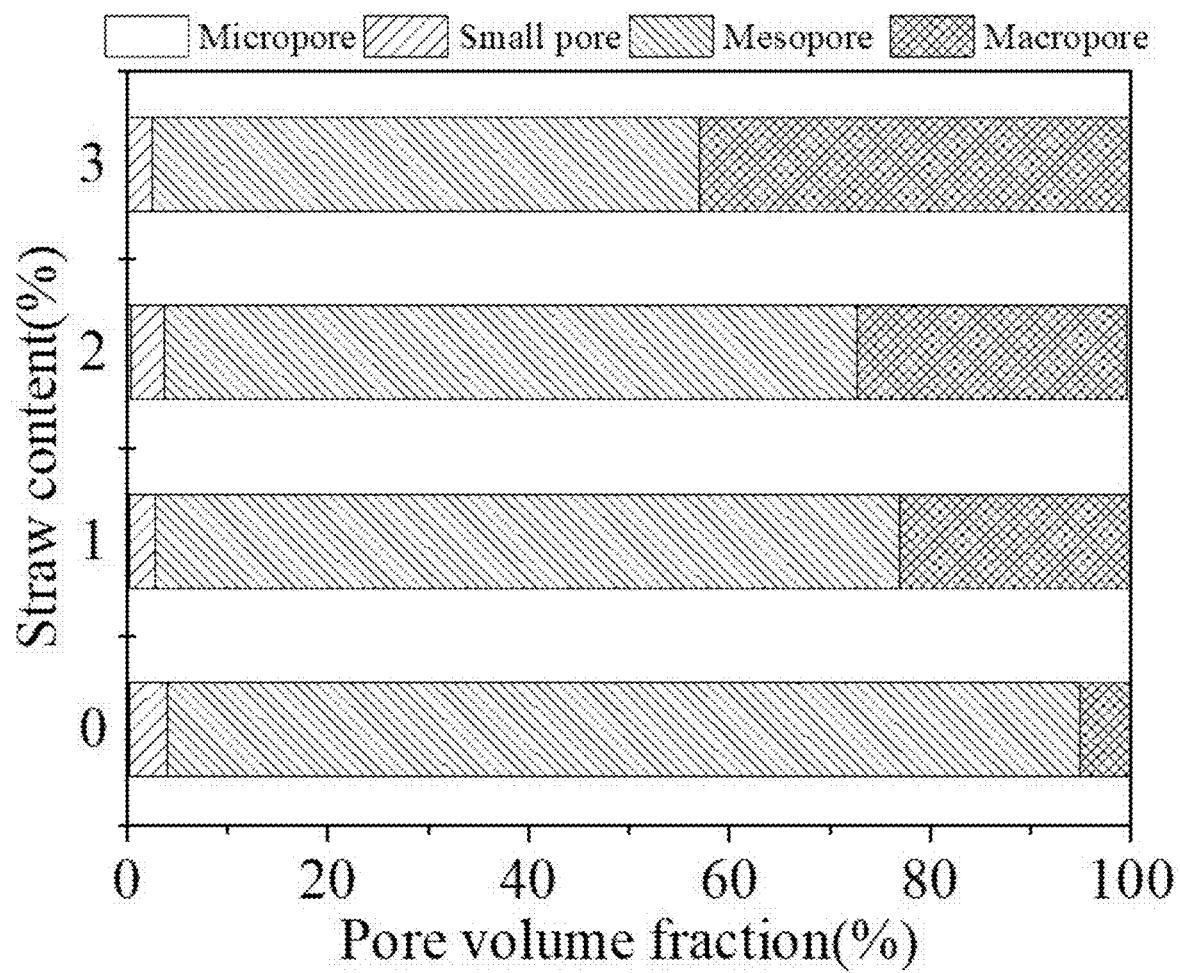

The microtopography graph of the lightweight solid waste porous aggregates prepared in Examples 3 to 5 and Comparative Example 1 is shown in FIG. 1A to FIG. 1D, where FIG. 1A represents Comparative Example 1, FIG. 1B represents Example 3, FIG. 1C represents Example 4, and FIG. 1D represents Example 5. The pore size distribution graph of the lightweight solid waste porous aggregates prepared in Examples 3 to 5 and Comparative Example 1 is shown in FIG. 2A to FIG. 2B, where FIG. 2A represents the pore diameter evolution diagram, and FIG. 2B represents the pore volume evolution diagram. As shown in FIG. 1A to FIG. 1D as the straw content increased, the number of macropores inside the aggregate increased significantly and the structure became looser, indicating that the incorporation of straw could significantly promote the formation of macropores inside the aggregate. As shown in FIG. 2A to FIG. 2B, as the straw content increased, the proportion of macropores inside the aggregate gradually increased, and the mesopores gradually changed into macropores, indicating that the incorporation of straw could increase the large pores and connected pores inside the aggregate.

Use Examples 1 to 5

The mix proportion of the concrete was designed according to the specification "Technical standard for application of lightweight aggregate concrete" (JGJ/T12-2019). The porous aggregate prepared in Example 5 was applied to lightweight aggregate concrete, and the design of the mix proportions is shown in Table 5:

Table 5 Mix proportions of the lightweight aggregate concrete prepared in Use Examples 1 to 5 (kg/m³)

| Group | Cement | Fly ash | Water | Sand | Natural pumice | Porous aggregate |
|---|---|---|---|---|---|---|
| Use Example 1 | 340 | 80 | 168 | 716 | 405 | 131.2 |
| Use Example 2 | 340 | 80 | 168 | 716 | 270 | 262.3 |
| Use Example 3 | 340 | 80 | 168 | 716 | 135 | 393.5 |
| Use Example 4 | 340 | 80 | 168 | 716 | 0 | 525 |
| Use Example 5 | 340 | 80 | 168 | 716 | 540 | 0 |

In Table 5, the cement was P.O42.5 ordinary Portland cement; the fly ash was Grade I fly ash produced by Jinqiao Thermal Power Plant in Hohhot, Inner Mongolia; the sand was natural river sand (with fineness modulus 2.6, water absorption 2.31%, and silt content 1.68%); the pumice was natural pumice from Heilaoyao Township, Horinger County, Hohhot City, Inner Mongolia (with cylinder compressive strength of 1.41 MPa, water absorption rate of 9.04%, and loss on ignition of 3.31%); and the water was laboratory tap water.

According to the specification "Standard for test methods of concrete physical and mechanical properties" (GB/T50081-2019), the compressive strength and splitting tensile strength of concrete were tested, and a thermal conductivity meter was used to test the thermal conductivity of concrete. The test results are shown in Table 6:

Table 6 Strength and thermal conductivity of the lightweight aggregate concrete prepared in Use Examples 1 to 5.

| Group | Compressive strength (MPa) | Splitting tensile strength (MPa) | Thermal conductivity (W/m · K) |
|---|---|---|---|
| Use Example 1 | 33.3 | 3.2 | 1.056 |
| Use Example 2 | 26 | 2.84 | 0.879 |
| Use Example 3 | 23.5 | 2.6 | 0.859 |
| Use Example 4 | 20.6 | 2.37 | 0.839 |
| Use Example 5 | 37.4 | 4.33 | 1.129 |

As shown in Table 6, with the increase of porous aggregate content, the compressive strength and splitting tensile strength of concrete gradually decreased, but the thermal insulation performance of concrete was improved; the porous aggregate concrete had desirable thermal insulation properties, with a thermal conductivity of 0.839-1.056 W/m·K.

The above descriptions are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:
1. A lightweight solid waste porous aggregate, comprising the following raw materials in parts by mass: 50 parts to 80 parts of a coal gangue, 20 parts to 50 parts of a fly ash, and 1 part to 3 parts of a straw;
   the lightweight solid waste porous aggregate is prepared by a method including:
   immersing the straw in an alkali solution to obtain a pretreated straw; the alkali solution is a sodium hydroxide solution having a mass percentage concentration of 2% to 4%; and the immersing is conducted at a temperature of 18° C. to 22° C. for 5 h to 7 h;
   mixing a part of the fly ash and a part of the coal gangue, then subjecting a resulting blend to first granulation, and then passing resulting pellets obtained in the first granulation through a 4 mm square hole sieve to remove a residual material that has not been formed into pellets to obtain an upper core material having a particle size of 5 mm; and a mass ratio of the part of the fly ash to the part of the coal gangue is in a range of (20-50) (80-50);

mixing a remaining of the fly ash, a remaining of the coal gangue, and the pretreated straw to obtain a mixture, and then subjecting the mixture to second granulation such that the mixture wraps the core material, and then selecting out a raw material globule having a particle size of 10 mm; and a mass ratio of the remaining of the fly ash, the remaining of the coal gangue, and the pretreated straw is in a range of (20-50):(80-50):(1-4.5); and subjecting the raw material globule to drying and calcination in sequence to obtain the lightweight solid waste porous aggregate.

2. The lightweight solid waste porous aggregate of claim 1, wherein the fly ash comprises Grade I fly ash.

3. The lightweight solid waste porous aggregate of claim 1, wherein the straw comprises one or more selected from the group consisting of corn straw, rice straw, and wheat straw.

4. A method for preparing a lightweight solid waste porous aggregate, the lightweight solid waste porous aggregate, comprising the following raw materials in parts by mass: 50 parts to 80 parts of a coal gangrene, 20 parts to 50 parts of a fly ash, and 1 part to 3 parts of a straw; and the method comprising:

immersing the straw in an alkali solution to obtain a pretreated straw; wherein the alkali solution is a sodium hydroxide solution having a mass percentage concentration of 2% to 4%; and the immersing is conducted at a temperature of 18° C. to 22° C. for 5 h to 7 h;

mixing a part of the fly ash and a part of the coal gangue, then subjecting a resulting blend to first granulation, and then passing resulting pellets obtained after the first granulation through a 4 mm square hole sieve to remove a residual material that has not been formed into pellets to obtain an upper core material having a particle size of 5 mm; wherein a mass ratio of the part of the fly ash to the part of the coal gangue is in a range of (20-50):(80-50);

mixing a remaining of the fly ash, a remaining of the coal gangue, and the pretreated straw to obtain a mixture, then subjecting the mixture to second granulation such that the mixture wraps the core material, and then selecting out a raw material globule having a particle size of 10 mm; wherein a mass ratio of the remaining of the fly ash, the remaining of the coal gangue, and the pretreated straw is in a range of (20-50):(80-50):(1-4.5); and subjecting the raw material globule to drying and calcination in sequence to obtain the lightweight solid waste porous aggregate.

5. The method of claim 4, wherein a granulator used for the first granulation is operated at a speed of 40 r/min to 60 r/min; and a granulator used for the second granulation is operated at a speed of 80 r/min to 100 r/min.

6. The method of claim 4, wherein the drying is conducted at a temperature of 100° C. to 105° C. for 4 h to 6 h.

7. The method of claim 4, further comprising subjecting the raw material globule to preheating prior to the calcination, wherein the preheating is conducted at a temperature of 500° C. to 550° C. for 20 min to 30 min.

8. The method of claim 4, wherein the calcination is conducted at a temperature of 1,050° C. to 1,200° C. for 20 min to 30 min.

9. The method of claim 4, wherein the fly ash comprises Grade I fly ash.

10. The method of claim 4, wherein the straw comprises one or more selected from the group consisting of corn straw, rice straw, and wheat straw.

11. The method of claim 7, wherein the calcination is conducted at a temperature of 1,050° C. to 1,200° C. for 20 min to 30 min.

* * * * *